United States Patent [19]

Hannappel et al.

[11] 4,015,101
[45] Mar. 29, 1977

[54] SCANNING DEVICE FOR WELDING TORCHES

[75] Inventors: Günther Hannappel, Frankfurt am Main; Günther Hahn, Hausen, both of Germany

[73] Assignee: Messer Griesheim GmbH, Frankfurt am Main, Germany

[22] Filed: Apr. 17, 1975

[21] Appl. No.: 568,889

[30] Foreign Application Priority Data

Apr. 20, 1974 Germany .................... 2419084

[52] U.S. Cl. .................... 219/125 PL; 318/576
[51] Int. Cl.[2] ........................ B23K 9/10
[58] Field of Search ............ 219/125 R, 125 PL; 228/45, 25; 318/576

[56] References Cited

UNITED STATES PATENTS

| | | | |
|---|---|---|---|
| 2,971,079 | 2/1961 | Sommeria | 219/125 PL |
| 3,017,496 | 1/1962 | Greene | 219/125 PL |
| 3,076,889 | 2/1963 | Enk | 219/125 R |
| 3,141,952 | 7/1964 | Preston | 219/125 PL |
| 3,171,071 | 2/1965 | Brown | 219/125 PL |
| 3,290,032 | 12/1966 | Brouwer | 219/125 R |
| 3,359,486 | 12/1967 | Brosious | 219/125 PL |
| 3,430,134 | 2/1969 | Flaherty et al. | 219/125 R |
| 3,480,756 | 11/1969 | Sullivan | 219/125 R |
| 3,484,667 | 12/1969 | Wofsey | 219/125 PL |

FOREIGN PATENTS OR APPLICATIONS

| | | | |
|---|---|---|---|
| 198,476 | 6/1967 | U.S.S.R. | 219/125 R |

*Primary Examiner*—J. V. Truhe
*Assistant Examiner*—Clifford C. Shaw
*Attorney, Agent, or Firm*—Connolly and Hutz

[57] ABSTRACT

A scanning device for causing a torch to follow impact lines or edges of the workpiece includes a magnet-field generator which moves transversely to the line to be followed as well as a scanning device which is characterized by two scanning heads arranged on both sides of the line being followed with the signals of the scanning head being electrically connected in opposition to each other.

7 Claims, 4 Drawing Figures

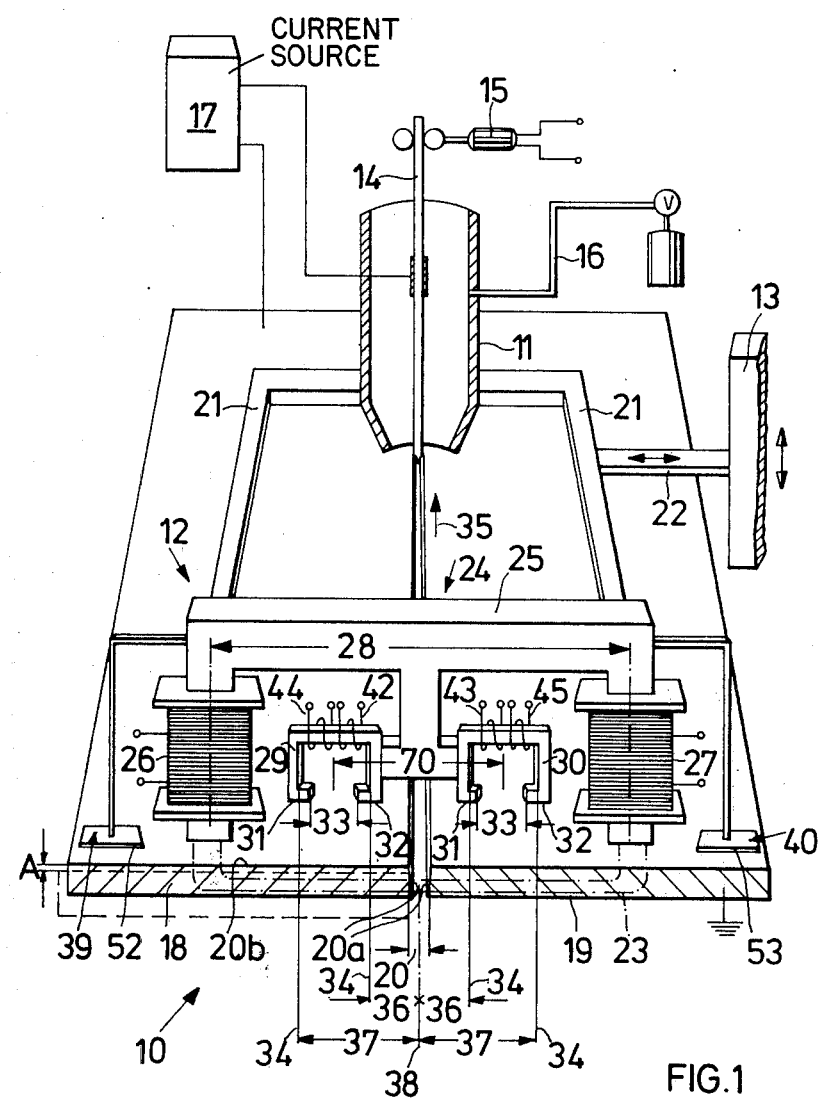
FIG.1
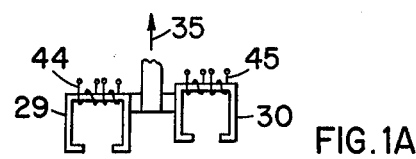
FIG.1A
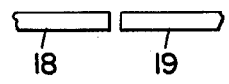

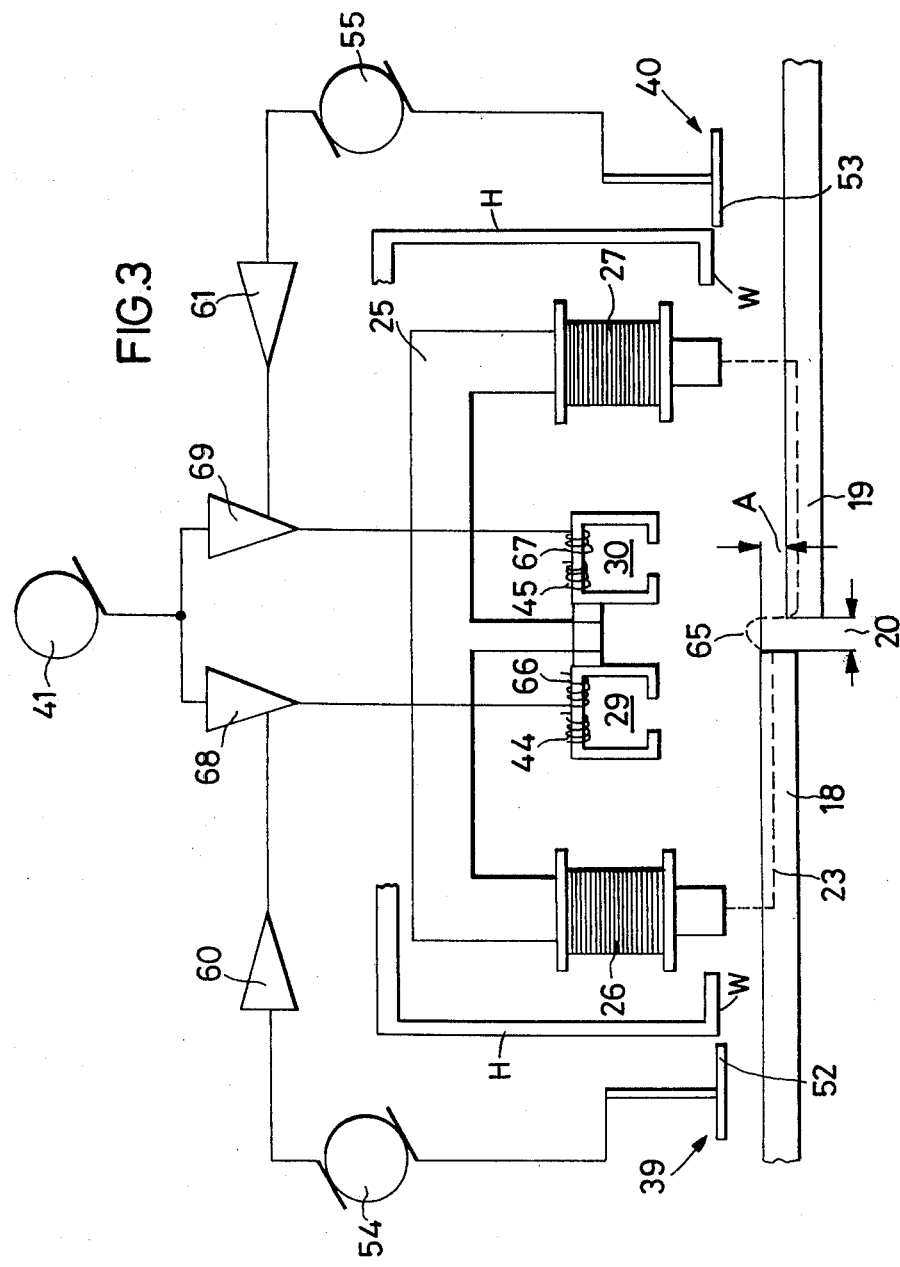

SCANNING DEVICE FOR WELDING TORCHES

BACKGROUND OF THE INVENTION

The present invention relates to equipment for automatic following-up of tools, in particular welding torches, along the boundary lines of the workpieces and/or the edges of the workpieces, with a magnetic scanning device, which works without contact, but is connected to the tool. Such equipment is applied in particular, when workpieces are butt-welded together by the autogenic-protective-gas-, or plasma-welding process. When butt-welding, the workpieces can be in contact or slightly spaced, depending upon which seam preparation is provided such as the case of an I-, I-, V-, X-, Y- or K-shaped seam preparation. Such seam preparations do not all allow a follow up of the welding burner by either mechanical scanning of the seam, or by photoelectrical processes.

The deficiencies of such scanning processes is caused, on the one hand, by the small distance between the plates, as mentioned above. On the other hand, the photoelectric scanning processes fail, because the optical contrast between the gap, which is formed between the two workpieces, and the metal areas limiting this gap, are too small.

Further difficulties for following up by the mechanical scanning, result also, because as often results in practice, the edges of the workpieces to be welded together are mechanically unsymmetrically treated at the preparation of the edges, or due to the fact that the plate-thickness fluctuates, that the plates are not level, or that the scanning mechanism finds insufficient guidance, due to the preceding root- and/or tackweldings.

To avoid the above-mentioned disadvantages of mechanical or photoelectric scanning devices, for the welding gap, it is known from German Patent DL-PS 55096, to scan the edges to be welded together, by means of a magnetic scanning device. For this purpose, only one scanning head is provided which scans the magentic stray-field, which leaves the area to be welded (hereinafter designated as gap). The outlet signal of the scanning head is led in as a lateral, regulating signal of a device for the lateral adjustment of the welding burner. However, such a device has the disadvantage that only ferro-magnetic materials can be scanned. A further disadvantage is that because of the scanning oscillation which is led back and forth with a definite frequency over the gap, only a gap larger than 0.5 mm. can be scanned. Beyond that, such a device is not suited to scan workpieces which are already connected in the root area of a welding seam - the gap being already closed by a lowest root layer.

SUMMARY OF THE INVENTION

It is the object of the invention to create a device which does not have the above-mentioned disadvantages, and which is particularly suited to scan smallest gap widths.

It is a further object of the invention to create a device for the scanning of non-ferromagnetic metals.

This problem is solved by starting from the device previously mentioned but, according to the invention the two scanning heads are arranged on both sides of the workpiece boundary-line and/or the workpiece edge, which has to be followed up, and that the starting signals of the scanning heads are electrically switched against each other.

By the invention it becomes possible to scan gap widths smaller than 0.5 mm., in particular gap widths, which are between 0.05 and 0.1 mm. Even at these extremely small gap widths does the device, according to the invention, still furnish a sufficient signal for the following-up of the welding burner. Such device is also suited to furnish sufficient follow-up signals for the burner at V-, X- and Y-shaped seam-joint preparations with distances of the edges to be welded together to about 15 mm. without changing the scanning system. Moreover, the device is advantageous for scanning workpieces of electrically conductive metals, in particular aluminum and copper.

Since the scanning heads are provided on both sides of the line being followed the magnetic field is built up by the magnetic-field producer, as well as the stray-field, projecting from the workpiece — the gap —, which is built up by the formation of eddy current by the above-mentioned transverse magnetic field. This takes place preferably point-focally. It is thus guaranteed, that the difference-output-voltage-signals produced by the two scanning heads by opposite switching, will produce a sufficiently strong signal for correction movements for deviations of the welding gap from a desired theoretical zero-line to within a range from 0.05 to 0.1 mm. For this purpose, scanning heads are provided as transducer heads with two magnetic, sensitive surfaces, whereby the two surfaces are at a distance of preferably 5–10 micrometers.

Such scanning heads are especially suited for precisely detecting stray and magnetic-fields of very low intensity. These small stray or magnetic-fields occur particularly at the gap scanning, when the workpieces contact each other, respectively are connected with each other by a root-layer. Above this root layer there are then formed only very weak stray-field components, buildup by the eddy current. These stray-field components are seized by the scanning heads and converted into a starting signal for the correction-movement of the welding torch.

THE DRAWINGS

FIG. 1 is a schematic representation of the device according to the invention, in combination with a welding torch;

FIG. 1A schematically illustrates a modified arrangement thereof;

FIG. 2 is an electrical diagram of connections of the controlling of the device according to the invention; and FIG. 3 is another embodiment of the device according to the invention.

DETAILED DESCRIPTION

Figure 2:
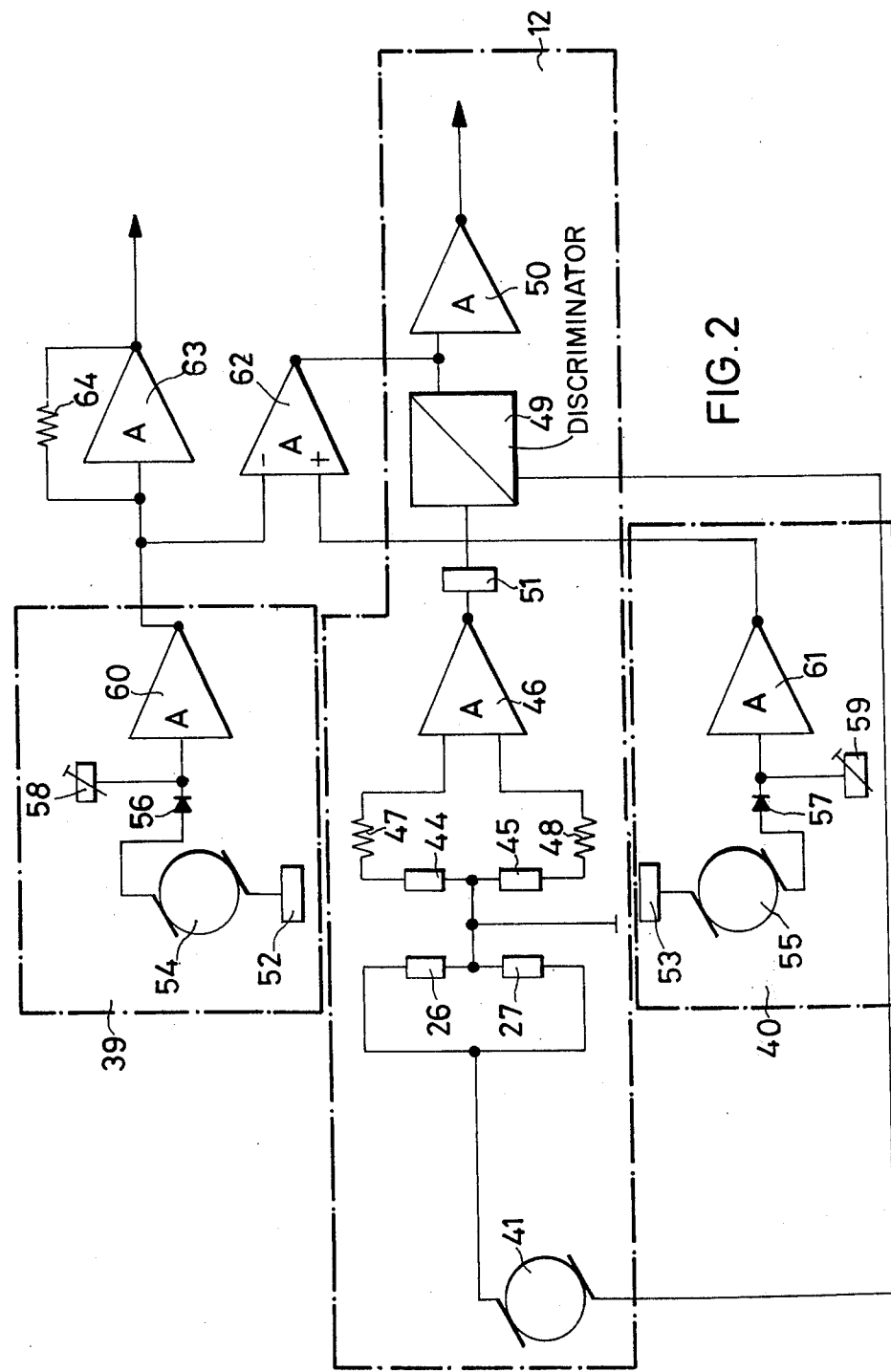

FIG. 1 illustrates the equipment for the automatic follow-up. The equipment 10 consists substantially of a welding torch 11, a magnetic scanning device 12, connected to the welding torch 11, as well as to the adjusting device 13, for lateral, height, and/or longitudinal movement of the welding torch and of the scanning device.

The welding torch 11, is formed in the exemplified embodiment, as a protective gas burner, known per se, with a consummable electrode 14. The electrode feeding is designated as 15 and the device for feeding the protective gas as 16. For the current supply, a current source 17 is provided which, on the one hand, is connected electrically with the electrode 14 and, on the other hand, with the workpieces 18 and 19 to be joined.

The workpieces 18 and 19, which can consist of a ferromagnetic material or a non-ferromagnetic material, such as e.g. aluminum and copper, are placed in the exemplified embodiment, on each other, in the so-called I-impact with the gap 20 or distance between the two workpieces 18 and 19 being shown exaggerated. In practice, this gap amounts to a few tenths millimeters.

The welding torch 11 is to follow automatically the gap 20, respectively following the workpiece impact-lines 20a and/or the workpiece edges 20b. The automatic following is accomplished by the magnetic scanning device 12, which is connected via levers 21, 22, on the one side with the welding torch 11 and on the other side with the schematically represented adjusting device 13.

The magnetic scanning device 12 comprises a magnetic field-generator 24, building up magnetic field 23, proceeding transversely to the impact line 20a of the workpiece, and/or to the workpiece edge 20b. The magnetic field-generator 24 comprises a magnet yoke 25, which is magnetized by alternating current via coils 26 and 27. The coils are thereby synonymously developed, and are in parallel, or in series connection to each other with an audio-frequency generator. In practice a distance 28 of the magnet yoke, between 20 and 50 mm. and an effective pole cross-section of about 25 $mm^2$, are advantageous operating parameters.

According to the invention, the scanning device 12 has a pair of scanning heads whose two scanning heads 29 and 30 are arranged on both sides of the gap 20, which has to be scanned. The two scanning heads are preferably tightly mechanically coupled to the yoke 25. The scanning heads 29 and 30 are formed in the same way, preferably as transducer heads, each with two magnetically-sensitive surfaces, whereby the surfaces 31 32, respectively, are separated at a distance 33, of preferably 5–10 micrometers. By this formation, an especially delicately sensitive detection of the magnet-field changes is obtained.

As FIG. 1 shows, in zero position of the magnetic scanning device 12, the central points 34 of the magnetically sensitive surfaces 31 and 32, seen transversely to the scanning direction 35, have the same distance 36, 37, to the desired plane of operation 38. Through this, it becomes advantageously possible by opposing the electrical starting signals of the scanning heads 29 and 30, without interposition of correction members, to directly produce a signal which is proportional to the mean deviation of the scanning heads from the plane of operation 38 when the plates to be connected lie in the same plane.

The two scanning heads 29 and 30 are arranged, in the exemplified embodiment, on one plane alongside of each other whereby the distance 70 lies preferably within the range between 1 and 10 mm.

However, it is also conceivable to arrange the scanning heads 29 and 30, seen in scanning direction 35, in staggered relation to each other, preferably by few millimeters as shown in FIG. 1a. This has the advantage that it is possible to bring the magnetically sensitive surfaces of the scanning heads very close and into the range of the impact-lines or the edges of the workpieces to be scanned, of the gap 20, when commercial transducer heads are being used.

Preferably the magnetic field generator 24 comprises the magnet yoke 25, which is magnetized by alternating current, and the coils 26 and 27, as well as the two scanning heads 29 and 30, are surrounded by a magnetically screening housing, which has an opening directed towards the workpieces. Accordingly, magnetic fields possibly generated outside of the entire device do not have any influence on the accuracy of the following up.

As FIG. 1 shows furthermore, according to the exemplified embodiment, each of the scanning heads is provided with a height-measuring device 39 and 40, which are preferably developed as capacitive height-measuring devices known per se. The way of functioning and the significance of these measuring devices will be discussed in greater detail in the following description.

FIG. 2 illustrates an electrical diagram of the inventive device with a low-frequency generator 41, with a frequency preferably higher than 5000 Hz, there is built up via the coils 26 and 27, as well as the magnet yoke 25, proceeding vertically, transversely to the gap 20, an alternating magnetic field. If the distances 30 and 37, represented in FIG. 1, are not of the same size, that means, therefore, that the scanning heads are, in reference to the operating plane 38, shifted towards the right or left of the desired plane 38 for the operation there are induced by the magnetic field 23, in the coils 42 and 43 of the scanning heads 29 and 30, different potentials. Since the windings 44 and 45 of the coils 42, 43, respectively, are connected directly opposite to each other, so that the resulting potentials are therefore shifted by 180° in phase-displacement opposite to each other, there appears at the exit of an operation-amplifier 46, to which the induced potentials are lead via damping resistances 47 and 48 a difference-potential between the individual potentials induced in the scanning heads 29 and 30. This difference potential is a direct measure of the deviation of the scanning unit from the desired plane of operation 38. In this connection it is pointed out that also an indirect opposite-connection of the windings 44 and 45 is possible, e.g. that the starting signals of the windings are modified first, via electrical building parts, such as amplifiers etc., and the resulting starting signals are first connected in opposition. It is essential that the signals, which can be traced back to starting signals of the scanning heads 29 and 30, are connected in opposition.

Whether a deviation from the plane of operation 38, towards the right or the left, exists is formed in a phase-discriminator 49, by direct comparison between the phase-position of the low-frequency generator 41, and the potentials furnished by the operation-amplifier 46.

Depending upon the phase position of the starting signal of the operation amplifier 46, there flows at the exit of the discriminator 49 a positive or negative current into the inlet of a further operation-amplifier 50. The signal, amplified in the amplifier 50, is conveyed to the burner sides adjusting device (designated in FIG. 1 as 13) by means of which the magnetic-scanning device 12 and also the tools, in this case the welding torch 11, are moved correspondingly to the desired working plane 38.

To prevent magnetic, disturbing influences, which occur e.g. upon igniting of strong-current arcs, there is provided before the discriminator a filter 51, which is built up according to the type of an effective connection, known per se, whose middle frequency is equal to the frequency of generator 41.

The above-described device is completely sufficient for the scanning of completely plane workpieces. In the case of uneven condition of the surfaces of the workpieces 18 and 19, there is formed at the exit of the discriminator 49 an outlet signal, even when the two scanning heads 29 and 30 are symmetrically right and left of the desired working plane 38, which means the distances 36 and 37 have right and left of the working plane 38 equal values.

The formation of the exit signal at the discriminator 49 can be traced to the fact that at uneven workpiece surfaces, in particular in the range which has to be scanned, the magnetic stray flux discharges unsymmetrically from the gap 20. To avoid the scanning mistake, caused thereby, there are provided for the scanning heads 29 and 30 two height-measuring devices 39 and 40, in the form of capacitive height-measuring devices, known per se. The measuring devices 39 and 40 have each scanning electrode 52, 53, respectively, which furnish in connection with high frequency generators 54 and 55, as well as the rectifiers 56 and 57, the sensitivity regulator 58 and 59, and the amplifiers 60 and 61, furnish a height-proportional signal. The difference of these height signals is a direct measurement for the height deviation of the two scanning heads 29 and 30. The height deviation is determined in a difference-amplifier 62, and the resulting outlet signal is led to the inlet of the amplifier 50, which steers the horizontal movement of the magnetic scanning unit 12 and of the welding torch 11, for the purpose of a correction of a position.

At the same time, the two outlet signals of the capacitive height-measuring devices, are led to an amplifier 63, which, by suitable dimensioning of a reconducting-resistance 64, causes a bisection of the potentials, furnished by the amplifiers 60 and 61, determines the mean value of the deviation of the height of the two scanning heads, and is conducted to a device (not shown) being known per se, for the height correction of the scanning device 13. This height correction of the magnetic scanning device has the advantageous effect that the lateral shifting of the scanning unit, caused by possible displacement of the workpiece, is avoided to a great extent.

FIG. 3 illustrates another exemplified embodiment according to the device of the invention, in schematic form, with a diagram of the electrical connections. This device corrects the lateral mistakes which occur at the scanning of uneven workpieces. The structural parts provided in FIG. 3, which are identical to the structural parts according to FIGS. 1 and 2, are provided with corresponding reference numerals.

Because of the different position of the workpieces to be scanned, the workpieces are vertically displaced from each other by a distance "A", there occur from the gap 20 unsymmetrically proceeding magnet-field lines, as it is schematically represented by the broken line 65.

By the arrangement of FIG. 3 the maximum of the discharging magnet-stray-field is displaced towards the right from gap 20, so that the scanning unit, a gap, being farther at the right, is simulated. Thus, an undesirably low potential is induced into the scanning head 30 by which, without correction, a lateral displacement would take place in an undesirable direction.

In order to avoid this, each scanning head 29, 30 is provided with an auxiliary winding. To these auxiliary windings 66 and 67 potentials are supplied, via the low-frequency generator 41, with interposition of control-amplifiers 68 and 69. The the control amplifiers 68 and 69, the initial voltage of the capacitive measuring devices (output voltage of the amplifiers 60, 61) is supplied.

By this it is attained that the internal resistance of the control amplifier becomes smaller, when the scanning electrodes 52 and 53, which are firmly connected to the magnet yoke 25, approach the workpieces 18 and 19.

By corresponding dimensioning of the auxiliary windings 66 and 67, there is induced in the windings 44, 45 an additional voltage, which is so high that half of the lateral deviation, conditioned by the workpiece height, change "A" is compensated.

This results in that the unsymmetry of the magnetic stray-flow, starting from gap 20 has a negligibly small influence on the scanning accuracy of the device.

For the above exemplified embodiments, the scanning head is developed preferably as transducer head. However, it is of course also possible, and is within the concepts of the invention, to provide as scanning head e.g. a sound device, halfconductor, structural elements, sensitive to magnets, such as transistors and the like.

Beyond that, it is of course self-evidently possible to use instead of the capacitive height-measuring devices, other height-measuring devices, working on a mechanical, pneumatic, electric, or optical base, and to introduce the resulting height signal, correspondingly as correction value into the control.

The device of the invention is advantageously applicable, for the automatic subsequent controlling of tools, such as welding torches, cutting torches, plasma burners, lasers, and the like, whereby the tools on machines can be provided with stationary foundation. For this it is particularly advantageous, when the outlet signal of the magnetic scanning device is connected with a servomotor of a coordinate system known per se, as it is described e.g. in house communications of the Schoppe und Faeser GmbH of December 1959, pages 121 to 134, is connected with a machine tool. Thereby, e.g. the use of technically steered coordinate toolmachines offers itself, whereby instead of the usual photoelectric scanning of data of drawings for following up a tool, now also the entire magnetic system can be provided in place of the photoelectrical scanning device. This has become possible especially due to the fact that by the invention a scanning system has been created which claims very little space, in which no magnet heads have to be provided, pending transversely or longitudinally to the planes being treated.

Beyond that, however, it is also possible to use the device according to the invention in connection with a freely movable, e.g. electrically driven tool, in particular welding torch carriages. It is proposed for this that the exit of the magnetic scanning device is connected with a velocity and/or direction-adjusting member of this freely movable carriage. Thus it becomes advantageously possible to create a mobile operation device, which is self-acting, following up a gap. This is in particular of advantage for welding equipment for the weldings of pipe coil with UP-burner carriage ship's-panel welding devices, for which MIG-MAG welding devices or UP-burner carriage, and even at vertical welding with the most different welding devices, are of advantage, since now the operator, who was necessary up to now, to lead the welding device along a welding gap.

Beyond this it is proposed in advantageous further formation of the invention to couple together one or several of the magnetic scanning devices, developed according to the invention, and to utilize the starting signals of the individual scanning devices for controlling different functions of a machine. Thus practice shows e.g. that a scanning unit, extended in front of the scanning system, determining the direction, when reaching the workpiece, release not only a timely release stop signal, but can also lead to the insertion of an electric storage place of the feeding ordinates, so that the spatially following tool, follows to the end of the workpiece the seam. Furthermore, it is possible, by such a device cut into the circuit, to reduce the feeding rate before sharp corners, in the interest of greatest accuracy in following up.

As schematically illustrated in FIG. 3, the magnetic field generator and scanning heads may be mounted in and surrounded by a magnetically protective shield H having an opening in, for example, end wall W directed toward the workpieces.

It has also been found that already at an alternating current magnetization of the workpiece of less than 50 Oe, furnish, through the magnet yoke 25, coordinated scanning heads, up to a distance of about 100 mm. unambiguous position signals, so that frequently several scanning units can be influenced by a magnetfield generator 24.

It is furthermore possible to use the device of the invention for the contour-true scanning of level or three-dimensional patterns, whereby then the lines to be followed are marked, e.g. by magnetizable symbol liquid or magnet foil.

What is claimed is:

1. A device for controlling the automatic following of a welding tool along a welding gap between two workpieces, said device including:
   a. a magnetic scanning device for scanning the welding gap without contacting the workpieces and being connected to the welding tool for controlling the movement thereof over the workpieces and along the welding gap, said scanning device comprising
      i. a magnetic field generator for generating a magnetic flux through the workpieces and across the welding gap,
      ii. a pair of transducer heads disposed for being arranged on both sides over the welding gap for sensing the magnetic flux perturbations along the welding gap,
   b. a horizontal adjusting device for centering the tool and said scanning device over the welding gap, said adjusting device comprising
      i. an adjusting motor
      ii. said motor being electrically connected to the outlet of said transducer heads,
   c. a control system for maintaining constant the distance of the scanning device from the workpieces, said control system comprising
      i. a pair of capacitive detector heads disposed for being arranged on both sides over the welding gap,
      ii. a vertical adjusting means electrically connected to said detector heads for the height correction of said scanning device,
      iii. difference amplifier means for forming a correction signal which is proportional to the average value of the two height signals from said detector heads,
      iv. the outlets of each of said detector heads being electrically connected to said difference amplifier means, and
      v. said difference amplifier means being electrically connected to the input of said adjusting motor of said horizontal adjusting device.

2. The device of claim 1 wherein each of said transducer heads is provided with two magnetically sensitive surfaces spaced apart by distance of from 5 to 10 $\mu$m.

3. The device of claim 2 wherein said tool has a plane of operation generally perpendicular to the workpieces and the distance from the center point of each magnetically sensitive surface of each transducer head to the plane of operation of the tool is the same as the respective distance of the respective magnetically sensitive surface of the other transducer head.

4. The device of claim 3 wherein said transducer heads are staggered with respect to each other with one of said transducer heads extending closer to the workpieces.

5. The device of claim 1 wherein said magnet field generator and said scanning heads are mounted in and surrounded by a magnetically protective shield having an opening directed toward the workpieces.

6. The device of claim 1 wherein the tool includes a coordinate system for controlling its movement over the workpieces, and the outlet of said scanning device is connected with an adjusting motor of the coordinate system of said tool.

7. The device of claim 1 wherein said tool is a freely movable electrically driven tool, and the outlet of said scanning device being connected to adjusting means for adjusting the movement of said tool.

* * * * *